March 25, 1930.  F. J. HINDERLITER  1,751,998
COMBINATION TAP AND DIE FISHING TOOL
Filed Oct. 22, 1928   2 Sheets-Sheet 2
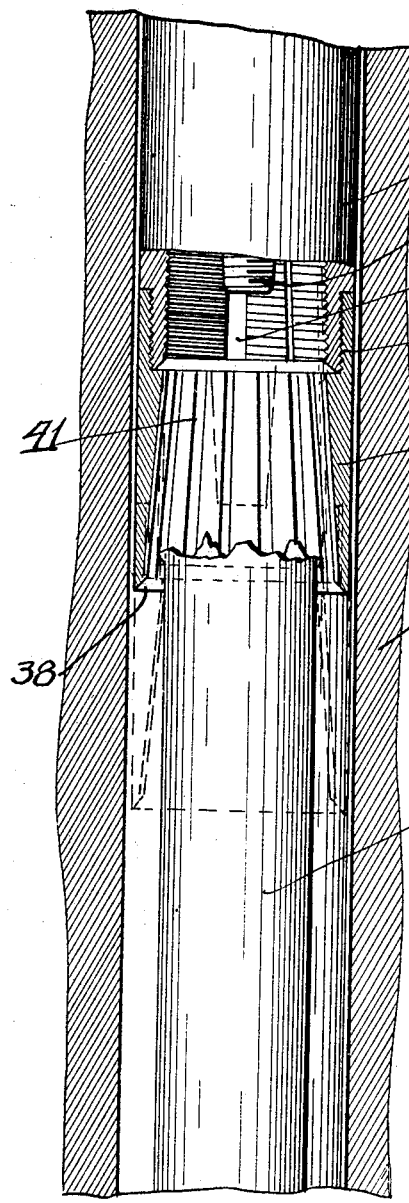
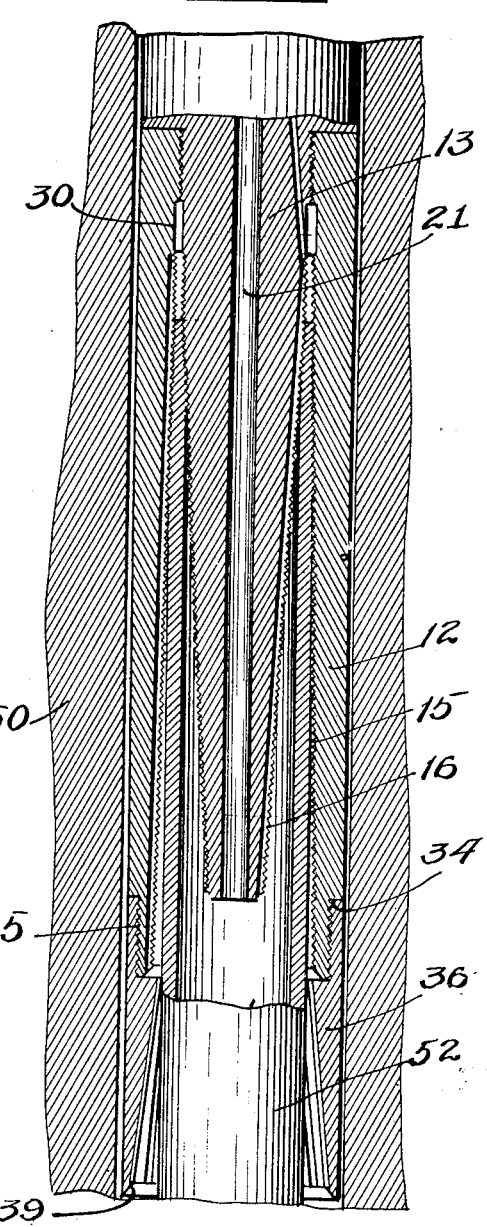
Inventor
Frank J. Hinderliter
by Charles Hill
Attys.

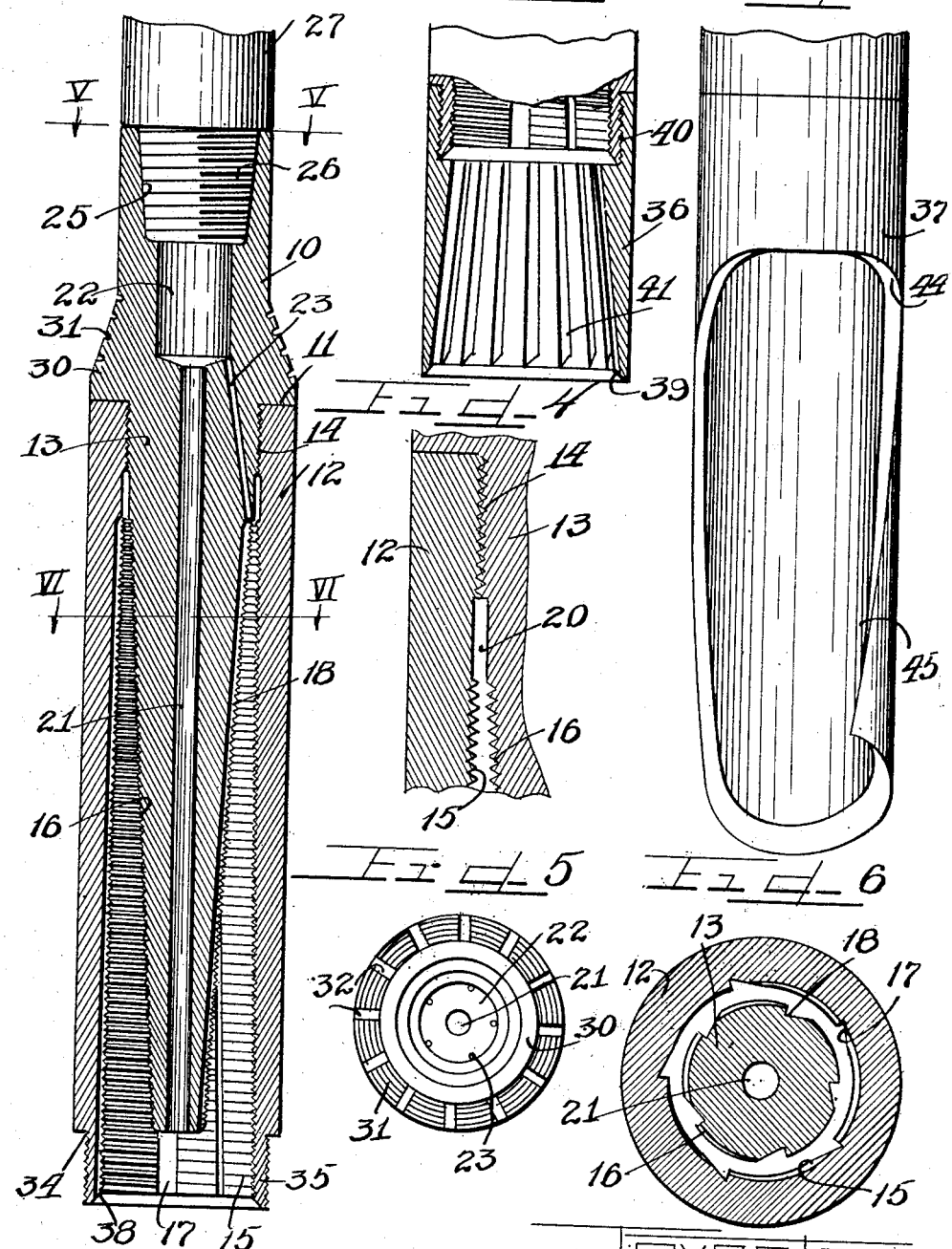

Patented Mar. 25, 1930

1,751,998

UNITED STATES PATENT OFFICE

FRANK J. HINDERLITER, OF TULSA, OKLAHOMA

COMBINATION TAP AND DIE FISHING TOOL

Application filed October 22, 1928. Serial No. 314,060.

This invention relates to fishing tools and more particularly to a fishing tool comprising a combination tap and die designed to thread the inner and outer surfaces of a tubular member being fished for in a well.

The object of the present invention is to provide an improved fishing tool for contemporaneously threading the inner and outer surfaces of a tubular member being fished for in the well whereby the member may be rigidly attached to the fishing tool.

In accordance with the general features of the present invention there is provided a combination tap and die fishing tool comprising a tubular portion internally threaded to form a die and a conical element extending into the tubular portion and having its outer surface threaded to form a tap; the conical element having a central water course.

Another feature of the invention resides in the provision of a fishing tool comprising a body having a central water passageway, a die element connected to said body and a tap element depending from the body and extending into the die, said tap and die having a plurality of slots disposed in communication with the water passageway in said body through which the chips formed during the threading of the fish may be washed clear of the tool.

Still another feature of the invention resides in the provision of a combination tap and die fishing tool having its lower end formed in such a manner as to be capable of having additional fishing tools attached thereto.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary sectional view taken through the preferred embodiment of a fishing tool embodying the features of this invention and illustrating the tool as being attached at its upper end to an element for lowering the same in the well.

Figure 2 is a fragmentary sectional view of the lower end of the tool shown in Figure 1 illustrating this end of the tool as being provided with a milling attachment designed for use during the fishing operation.

Figure 3 is an elevation of a guide tube designed for use during the fishing operation and illustrating this tube as being attached to the lower end of the fishing tool shown in Figure 1.

Figure 4 is an enlarged fragmentary sectional view of a portion of Figure 1 illustrating the connection between the tubular portion and the body of the tool.

Figure 5 is a plan view of the tool shown in Figure 1 taken on substantially the line V—V of Figure 1, looking downwardly.

Figure 6 is an enlarged sectional view taken on substantially the line VI—VI of Figure 1, looking downwardly.

Figure 7 is an enlarged fragmentary sectional view partly in elevation illustrating the use of a milling attachment such as that shown in Figure 2 in connection with the fishing tool embodying the features of this invention and showing the milling attachment in the process of removing burrs from the upper end of a tube or fish in a well casing.

Figure 8 is an enlarged fragmentary sectional view similar to Figure 7 illustrating how the fishing tool threads and taps the tube or fish to be removed from the well casing.

As shown on the drawings:

The fishing tool shown in Figure 1 comprises a body 10 having an intermediate annular shoulder 11 against which is disposed the upper end of a tubular portion or element 12. The body 10 has extending downwardly from its shoulder 11 a conical element 13 which extends through the tubular portion or sleeve 12. The upper end of the tubular portion 12 is threaded at 14 upon the upper end of the conical element 13.

The internal surface of the tubular portion 12 is threaded to form a die 15. Also the conical surface of the element 13 is threaded to form a tap 16. The threaded portion or die 15 is provided with a plurality of vertical slots or grooves 17 and the threaded portion or tap 16 is provided with a plurality of vertical grooves or slots 18. These slots or grooves 17 and 18 perform two functions, viz to define the cutting edges of the tap and die and to serve as passageways through which the water may conduct the chips out of the tube formed during the threading of the fish or tube to be removed from the well.

In Figure 4 it will be noted that the threads as indicated at 14 on the tubular portion or sleeve 12 and the element 13 are of substantially the same pitch as the threads 15 and 16 comprising the die and tap. The reason for this, as will become more apparent with the progress of the present description, is so that the element 13 may be contemporaneously unscrewed from the fish or tube and the sleeve 12, after the fish has been removed from the well casing.

Positioned between the lower ends of the threaded portions designated at 14 and the upper ends of the threaded portions 15 and 16 is a ring-like space 20 which communicates at its lower end with the vertical slots or grooves 17 and 18 in the sleeve 12 and the element 13.

Positioned centrally of the element 13 is a water course 21 extending the full length of the element and having its upper end in communication with an enlarged water passageway or chamber 22 formed in the center of the body 10. This passageway or chamber 22 is connected to the ring-like space 20 by means of a plurality of diagonal and diverging passageways 23. It will therefore be evident that the passageway 22 is designed to discharge water through the central water course 21 in the elements 13 and also through the water space 20 into the grooves or slots 17 and 18.

The upper end of the body 10 is provided with a threaded socket or box 25 adapted to receive the threaded pin 26 on the lower end of the tube or casing 27 by means of which the fishing tool is lowered into the well casing. Water is supplied to the chamber 22 from a suitable source connected to the upper end of the tube or casing 27.

The portion of the body 10 directly above the shoulder 11 is formed on a slant as indicated at 30 and is provided with a plurality of annular grooves 31. These grooves 31 are cut by a plurality of transverse grooves 32 extending radially from the axis of the body 10 and so as to provide this slanting portion 30 of the body with cutting edges. The function of these cutting edges is to enable the fishing tool to grind or mill its way out of any mud or other matter which might accumulate upon the slanting portion 30 during the fishing operation.

The lower end of the tubular portion or sleeve 12 is reduced as indicated at 34 and is provided with a thread 35. This threaded reduced portion is designed to have mounted thereon a fishing tool attachment, such for example as the mill 36 shown in Figure 2 or the guide tube 37 shown in Figure 3.

It is of course understood that there are a great many other types and forms of fishing tool attachments which may be used in connection with the reduced lower end of my novel fishing tool.

The extreme lower and inner end of the sleeve or tubular portion 12 is beveled inwardly as indicated at 38 so as to facilitate the fitting of the sleeve over the tube to be removed from the well in the event that a guide tube such as the one shown in Figure 3 or some other analogous attachment is not used in conjunction with my fishing tool.

The mill 36 shown in Figure 2 comprises a tube beveled as indicated at its lower end by the reference character 39 and provided with a threaded socket 40 adapted to be mounted on the threaded reduced end of the fishing tool shown in Figure 1. The interior surface of the mill 36 is provided with a plurality of slanting vertical grooves 41 which serve to define the cutting edges in the mill as is well known in the art.

The guide tube 37 comprises a hollow cylinder having its upper end provided with a socket such as the socket 40 in the mill 36 for receiving the lower end of the fishing tool shown in Figure 1. The lowermost portion of the tube 37 is cut away as indicated at 44 in order to provide a helical portion 45 for facilitating the alignment of the fish or tube with the interior of the sleeve 12 of my fishing tool.

The operation and use of my novel fishing tool is briefly as follows:

Prior to the lowering of the tool in a well such as that designated by the reference character 50 in Figures 7 and 8, an attachment, such for example as the mill 36, may be threaded upon the lower end of the fishing tool proper. Thereafter the tool is lowered into the well by means of the tubing 27 (Figure 1).

When the cutting edges defined by the slots or grooves 41 in the mill 36 come into engagement with the upper edge of the fish or tube 52 to be removed from the well, these cutting edges serve to remove any burrs or other irregularities from the upper end of the fish. That is to say by rotating the fishing tool, the mill 36 will operate to grind off the burrs on the upper or ragged end of the fish or tube 52 shown in Figures 7 and 8.

As the fishing tool is rotated further down into the well 50, the threads 15 on the sleeve portion 12 come into engagement with the outer surface of the fish or tube 52. The cutting edges defined by the slots 17 in the threads 15 thereafter serve to thread the outer surface of the tube 52. It will be evident from Figure 8 that the fishing tool is threaded downwardly over the tube 52 until the thread 16 on the conical element 13 comes into engagement with the inner surface of the tube 52. The slots 18 in this thread 16 thereafter serve to tap the inner surface of the tube 52 as shown in Figure 8. This results in the fish or tube 52 being tightly wedged to the fishing tool whereby it may be withdrawn from the well 50 with the tool.

After the fishing tool and the tube 52 have been removed from the well, the element 30 connected to the body 10 may be contemporaneously unscrewed from both the sleeve portion 12 and the tube 52. This is possible due to the fact that the pitch of the threads designated at 14 in Figure 4 is the same as the pitch of the threads 16 on the element 13. Obviously, after the conical element has been removed from the fish and the sleeve 12, the fish or tube 52 may be readily unscrewed from the sleeve 12.

Now it is of course understood that many changes may be made in this invention and numerous details thereof may be varied through a wide range without deviating from the principles of the invention and therefore the invention is only to be limited insofar as defined by the scope and spirit of the appended claims.

I claim as my invention:

1. In combination in a fishing tool, a body having a tubular portion, said tubular portion being internally threaded to form a die, and an element extending into said tubular portion from said body and having its outer surface threaded to form a tap.

2. In combination in a fishing tool, a body having a tubular portion, said tubular portion being internally threaded to form a die, and an element extending into said tubular portion from said body and having a conical surface threaded to form a tap, said tap being positioned to thread the inner surface of a tube or fish at the same time as the die threads the outer surface of the tube being fished for.

3. In combination in a fishing tool, a body having a tubular portion, said tubular portion being internally threaded to form a die, and an element extending into said tubular portion from said body and having its outer surface threaded to form a tap, both of said threaded portions having a plurality of slots and said body having a water passageway in communication with said slots.

4. In combination in a fishing tool, a body having a tubular portion, said tubular portion being internally threaded to form a die, and an element extending into said tubular portion from said body and having its outer surface threaded to form a tap, both of said threaded portions having a plurality of slots and said body having a water passageway in communication with said slots, said element also having a central watercourse in communication with said passageway.

5. In combination in a fishing tool, a body having a tubular portion, said tubular portion being internally threaded to form a die, and an element extending into said tubular portion from said body and having its outer surface threaded to form a tap, said body having its upper end provided with an annular beveled surface threaded to serve as a mill whereby said tool can mill its way upwardly out of any mud or other matter which may accumulate thereon.

6. In combination in a fishing tool, a body having a tubular portion, said tubular portion being internally threaded to form a die, and an element extending into said tubular portion from said body and having its outer surface threaded to form a tap, both of said threaded portions having a plurality of slots which serve to define cutting edges in said threaded portions and said body having a water passageway and diagonal grooves for connecting the passageway with said slots.

7. In combination in a fishing tool, a body having a tubular portion, said tubular portion being internally threaded to form a die, and an element extending into said tubular portion from said body and having its outer surface threaded to form a tap, both of said threaded portions having a plurality of slots and said body having a ring-like water space disposed in communication with said slots.

8. In combination in a fishing tool, a body having a tubular portion, said tubular portion being internally threaded to form a die, and an element extending into said tubular portion from said body and having its outer surface threaded to form a tap, said tubular portion comprising a sleeve threaded upon the upper end of said element, said element having its upper end provided with a thread having the same pitch as that of the tap whereby said element may be simultaneously unscrewed from the sleeve and the fish connected thereto after the removal of the tool and fish from the well.

In testimony whereof I have hereunto subscribed my name at Tulsa, Tulsa County, Oklahoma.

FRANK J. HINDERLITER.